US009227256B2

(12) United States Patent
Emerson

(10) Patent No.: US 9,227,256 B2
(45) Date of Patent: Jan. 5, 2016

(54) SPLIT RETHREADING TAP

(71) Applicant: John M. Emerson, College Corner, OH (US)

(72) Inventor: John M. Emerson, College Corner, OH (US)

( * ) Notice: Subject to any disclaimer, the term of this patent is extended or adjusted under 35 U.S.C. 154(b) by 308 days.

(21) Appl. No.: 13/688,674

(22) Filed: Nov. 29, 2012

(65) Prior Publication Data

US 2014/0147223 A1    May 29, 2014

(51) Int. Cl.
*B23G 5/14* (2006.01)
*B23G 9/00* (2006.01)

(52) U.S. Cl.
CPC *B23G 5/14* (2013.01); *B23G 9/009* (2013.01); *Y10T 408/04* (2015.01); *Y10T 408/8588* (2015.01)

(58) Field of Classification Search
CPC .... B23G 5/14; B23G 9/009; Y10T 408/8588; Y10T 408/858953; Y10T 408/858946; Y10T 408/858955; Y10T 408/85843; Y10T 408/858; Y10T 408/8583; Y10T 408/85895; Y10T 408/9048
USPC ......... 408/153, 154, 156, 165, 168, 169, 170, 408/222; 470/201, 203
See application file for complete search history.

(56) References Cited

U.S. PATENT DOCUMENTS

| | | | | |
|---|---|---|---|---|
| 53,996 A | | 4/1866 | Loomis | |
| 184,097 A | * | 11/1876 | Melvin | 408/169 |
| 316,040 A | | 4/1885 | Johnson | |
| 386,708 A | * | 7/1888 | Jetter | 408/156 |
| 670,531 A | * | 3/1901 | Burley | B23G 5/14 408/158 |
| 765,906 A | * | 7/1904 | Russell | B23G 5/14 408/158 |
| 892,871 A | * | 7/1908 | McCrosky | 408/169 |
| 899,759 A | * | 9/1908 | Reiss | 408/169 |
| 909,749 A | * | 1/1909 | Brown et al. | B23G 5/14 408/148 |
| 1,075,753 A | * | 10/1913 | Bastian et al. | 408/154 |
| 1,172,781 A | * | 2/1916 | Forsyth et al. | 408/170 |
| 1,246,245 A | * | 11/1917 | Demarchi | 408/169 |
| RE14,470 E | * | 5/1918 | Phelps | 470/188 |
| 1,265,888 A | * | 5/1918 | Dugar | 408/170 |
| 1,304,574 A | * | 5/1919 | Knapp | 408/154 |
| 1,331,138 A | * | 2/1920 | Baldwin | B23G 5/14 408/172 |
| 1,345,744 A | * | 7/1920 | Boehm | B23G 5/14 408/142 |
| 1,356,867 A | * | 10/1920 | Koontz | 408/169 |
| 1,391,639 A | * | 9/1921 | Koontz | 408/73 |
| 1,408,706 A | * | 3/1922 | James | 408/170 |
| 1,435,695 A | * | 11/1922 | Breitenstein | 408/169 |
| 1,530,293 A | * | 3/1925 | Breitenstein | 408/148 |
| 1,614,627 A | * | 1/1927 | Peterson | 408/164 |
| 2,060,949 A | * | 11/1936 | Pace | 408/73 |
| 2,067,593 A | * | 1/1937 | Benninghoff | 408/169 |
| 2,284,768 A | * | 6/1942 | Ramsdell | 408/156 |
| 2,333,462 A | * | 11/1943 | Burt | 408/156 |
| 2,472,554 A | * | 6/1949 | Volis | 408/154 |

(Continued)

*Primary Examiner* — Eric A Gates
(74) *Attorney, Agent, or Firm* — MacCord Mason PLLC

(57) ABSTRACT

Damaged threads in a blind tapped hole are repaired with a tap having an elongated shaft with a plurality of outer faces, and a plurality of flutes corresponding to the number of shaft outer faces, each flute has an outer face with a lower segment with cutting threads corresponding to the hole threads, and is moveable radially between a closed position toward the longitudinal axis and a radially expanded position in which the threads of the flute outer face mesh with the threads of the hole. The tap is inserted into the hole while the flutes are in the closed position so that the cutting threads are below the damaged threads. The shaft is then inserted between the flutes to move the flutes to their expanded positions meshing the cutting threads with undamaged threads below the damaged threads. The tap is then rotated to repair the damaged threads.

12 Claims, 4 Drawing Sheets

(56) References Cited

U.S. PATENT DOCUMENTS

| | | | |
|---|---|---|---|
| 4,097,180 A * | 6/1978 | Kwieraga | ............... 408/154 |
| 4,661,028 A | 4/1987 | Sanger | |
| 5,281,059 A | 1/1994 | Stuckle | |
| 5,718,636 A | 2/1998 | Meyn et al. | |
| 8,821,081 B1 * | 9/2014 | Foss | ............... B23G 5/14 |
| | | | 408/1 R |

* cited by examiner

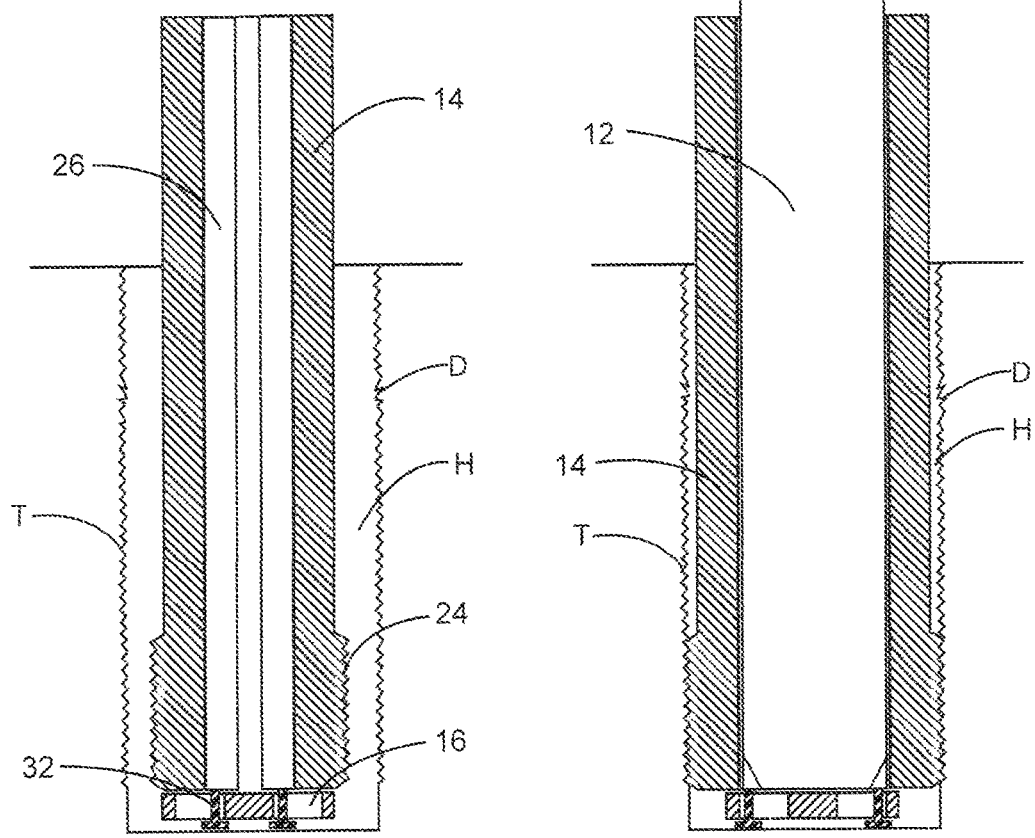

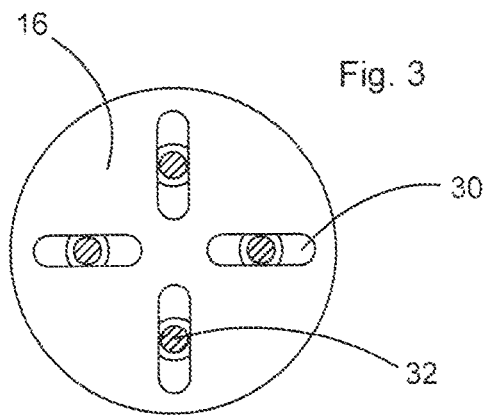
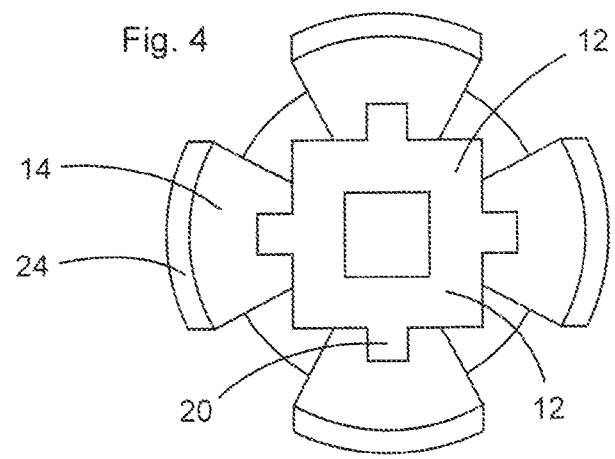
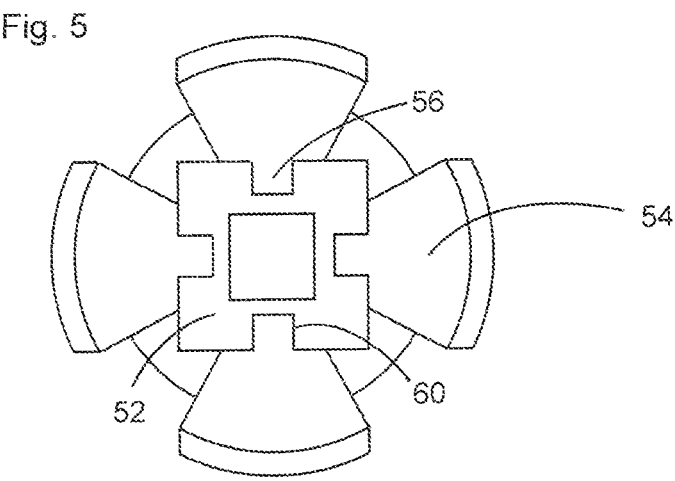

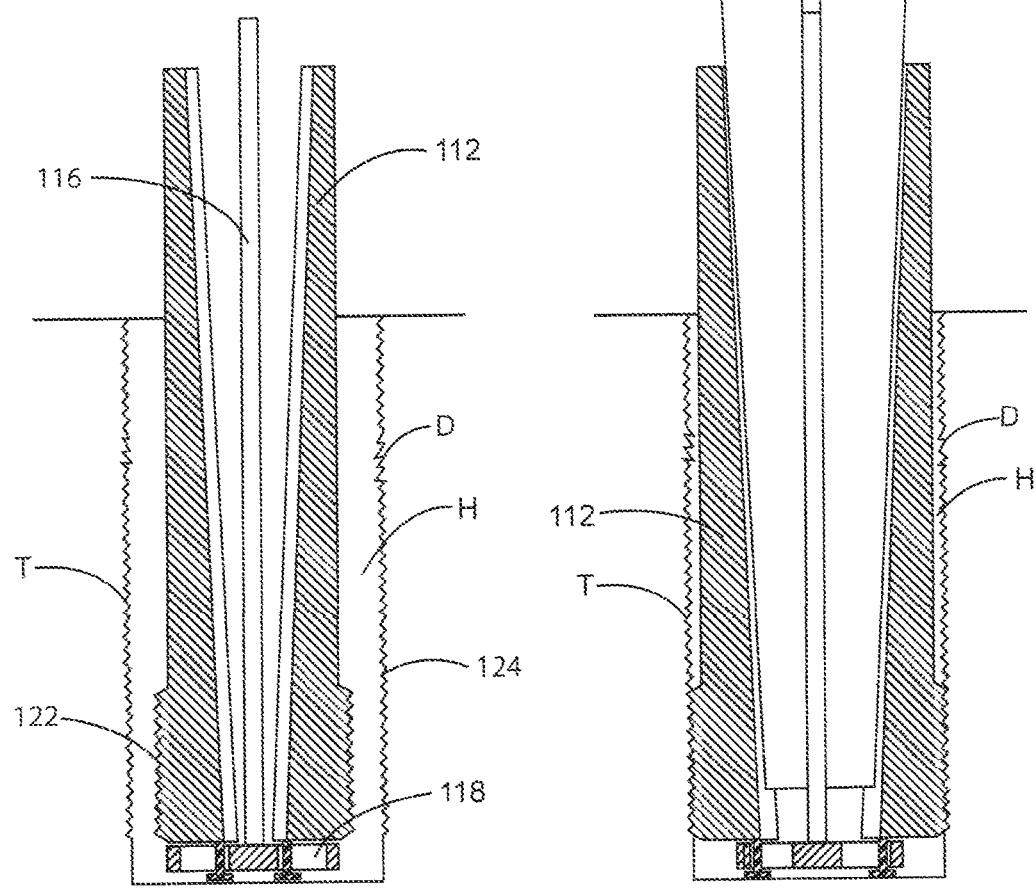

US 9,227,256 B2

SPLIT RETHREADING TAP

This application claims the benefit of the filing date of U.S. Provisional Application Ser. No. 61/568,242, filed Dec. 8, 2011, which is incorporated herein by reference in its entirety.

BACKGROUND OF THE INVENTION (1) Field of the Invention

The present invention relates generally to an improved tap useful in rethreading blind tapped holes having damaged threads, and in particular to a rethreading tap that can be inserted into a hole with damaged threads so that the tap cutting teeth are positioned beneath the damaged area and then expanded for repair of the damaged threads.

(2) Description of the Prior Art

Blind threaded holes are commonly formed in metal, plastic or other materials by drilling a hole, and then inserting the distal end of a tap having a diameter slightly larger than the diameter of the drilled hole. The tap is slowly rotated with a T-shaped handle that is attached to the upper end of the tap with a collet or chuck, taking care to keep the tap aligned with the hole. Rotation of the tap clockwise cuts threads in the face of the hole. Periodically, the tap is rotated counterclockwise to remove debris.

Holes that do not extend entirely through the material are referred to as blind holes. In use, a threaded bolt, threaded rod, or the like, with threads matching the hole threads is screwed into the hole. Over time, the blind hole threads may be damaged, often by a user attempting to screw in a misaligned bolt, by impact on the bolt head, or other reasons. Often, the thread damage is restricted to the surface end of the hole, while the threads further in the hole remain undamaged.

Repair of the hole, if possible, often requires redrilling and tapping of a larger diameter hole, which in turn requires the use of a larger diameter bolt. Alternatively, the blind hole may be drilled out so that a threaded insert, can be fitted into the hole.

Neither of these solutions is desirable. Use of a larger diameter bolt may not be possible due to the requirement of other components. Fitting of an insert is time consuming, expensive, and does not have the strength of a drilled hole. Therefore, there is a continuing need for a method and device that will enable rethreading of a damaged threaded, blind hole, particularly where the thread damage is near the surface of the hole.

SUMMARY OF THE INVENTION

Generally, the improved tap rethreading tool of the present invention is comprised of an elongated central expansion shaft having a central longitudinal axis that is insertable between a plurality of flutes, which are attached at their bottoms to a guide plate that allows the flutes to move radially between a closed position for insertion into the threaded hole to be repaired and a radially expanded position in which the threads of the flutes mesh with the hole threads.

The flutes preferably include outwardly inclined inner faces with ribs or grooves, while the outwardly inclined expansion shaft outer faces equal in number to the number of flutes, include mirroring ribs or grooves to position the flutes relative to the shaft. The tool also preferably includes a guide rod that extends centrally upward from the guide plate within the flutes, while the expansion shaft includes a central bore along the tap longitudinal axis to receive the guide rod, thereby ensuring central alignment of the shaft.

Due to the angularity of the shaft outer walls and the flute inner walls, which have the same angle of inclination as that of the shaft, the lower end of the shaft is of a smaller diameter than the upper end of the shaft. As a result, insertion of the shaft downwardly within the flutes causes the flutes to move outwardly until the flute cutting threads engage the hole threads beneath the damaged threads. The tool may be used to repair threads in holes of different diameters, with the extent of insertion of the shaft being determined by the hole diameter.

In operation, the tap is inserted into a hole of a given diameter while the flutes are in the closed position and the tap has a diameter less than the diameter of the hole so that the tap cutting threads are below the damaged threads. The shaft is then inserted between the flutes to move the flutes to their expanded positions whereby the cutting threads mesh with undamaged hole threads below the damaged threads. The tap is then rotated, normally counterclockwise, to move the cutting threads into engagement with the damaged threads to repair said damaged threads.

BRIEF DESCRIPTION OF THE DRAWINGS

FIG. 1 is a sectional side view of a first embodiment of the split rethreading tap flutes shown in a non-expanded state and inserted into a blind hole to be rethreaded.

FIG. 2 is a sectional side view of the first embodiment of the split rethreading tap expanded in preparation for rethreading.

FIG. 3 is a top view of the flute guide plate of the tap of FIG. 2.

FIG. 4 is a top view of the tap of FIG. 2 showing one manner of holding the flutes and central expansion shaft in alignment.

FIG. 5 is a top view of the tap of FIG. 2 showing another manner of holding the flutes and central expansion shaft in alignment.

FIG. 6 is a sectional side view of a second embodiment of the split rethreading tap flutes shown in a non-expanded state and inserted into a blind hole to be rethreaded.

FIG. 7 is a sectional side view of a second embodiment of the split rethreading tap expanded in preparation for rethreading.

DETAILED DESCRIPTION OF THE INVENTION

Figure 8:
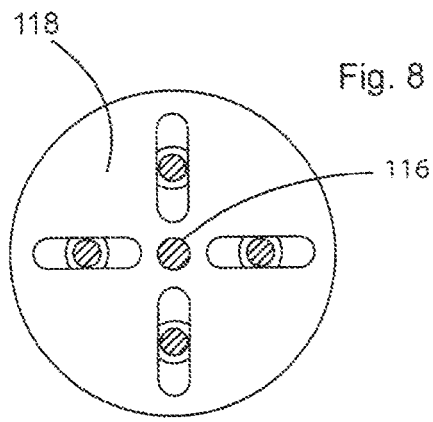
FIG. 8 is a top view of the flute guide plate of the tap illustrated in FIGS. 6 and 7.

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

As seen in the drawings, a first embodiment of the present rethreading tap, generally 10, is comprised of an elongated central expansion shaft 12, and a plurality of flutes 14. A guide plate 16 is adjustably attached to the bottoms of flutes 14 to hold and align the flutes.

In the first embodiment shown in FIG. 4, shaft 12 has a square cross-section, with ribs 20 extending radially outward from each face of shaft 12. Upper end 22 of shaft 12 is shaped for insertion into the collet or chuck of a tool, such as a conventional tap handle, used to turn the rethreading tap. The cross-section of shaft 12 below upper end 22 is generally uniform in diameter, except for the lower end, which may be tapered.

Each elongated flute 14 includes a section of inclined cutting teeth 24 on the outer surface of the lower end of the flute. Each flute 14 also includes an elongated inner groove 26 sized to slidably receive one of ribs 20.

Guide plate 16 includes one radial slot 30 for each of flutes 14. As illustrated, plate 16 includes four radial slots to align four flutes. Each of flutes 14 is slidably attached to plate 16 to permit each flute 14 to move radially between a closed position In the first embodiment, each flute 14 is attached to plate 16 with a pin 32 that is inserted upwardly through one of slots 30 into the lower end of flute 14. Pin 32 has a shaft that has a smaller diameter than the width of slot 30 and a head that has a diameter greater than the width of slot 30, thereby securing flutes 14 to plate 16, but permitting pins 32, and thereby flutes 14, to move between their closed and expanded positions.

In the alternative embodiment illustrated in FIG. 5, each flute 54 has a rib 56 extending radially inwardly, while shaft 52 includes a groove 60 on each face to receive one of ribs 56. It will be apparent to one skilled in the art that the two embodiments function in the same manner, the different embodiments merely being a mirroring of the ribs and grooves.

When using the preferred device, flutes 14, slidably attached to plate 16, are inserted into a blind hole H having damaged threads, with flutes 14 being in their closed position as shown in FIG. 1. Plate 16 is placed in the bottom of hole H. Shaft 12 is then inserted into the center of flutes 14 with ribs 20 sliding within grooves 26 until the bottom of shaft 12 is adjacent plate 16.

Insertion of shaft 12 forces flutes 14 outwardly to their expanded position, causing cutting teeth 24 to mesh with blind hole threads T adjacent the bottom of hole H and beneath damaged threads D as shown in FIG. 2. A handle or other tool is then attached to upper end 22 of shaft 12, and shaft 12 is turned counterclockwise so that cutting teeth 24 move upwardly along threads T. When the damaged area is reached, cutting teeth 24 recut the damaged threads to proper alignment. Occasional reversing of the direction of rotation of shaft 12 may be required to clear debris. After the damaged threads are repaired, shaft 12 is withdrawn from within flutes 14, which are returned to their closed position and withdrawn from repaired hole H.

The alternative embodiment shown in FIG. 5 is used in the same manner, with grooves 60 of shaft 54 slidably receiving ribs 56 of flutes 54.

Figure 9:
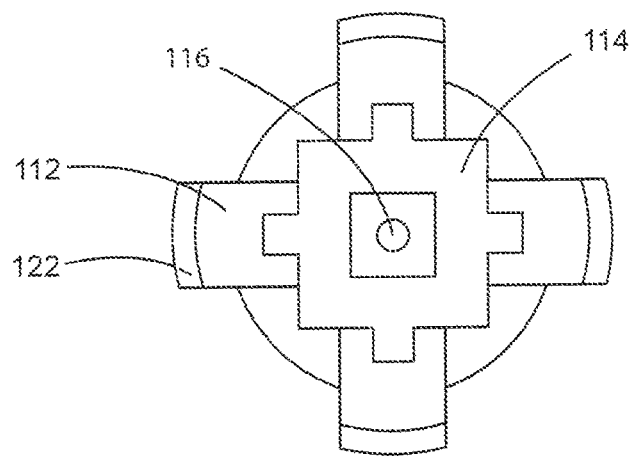
FIG. 9 is a top view of the tap of FIG. 7 showing one manner of holding the flutes and central expansion shaft in alignment.
Figure 10:
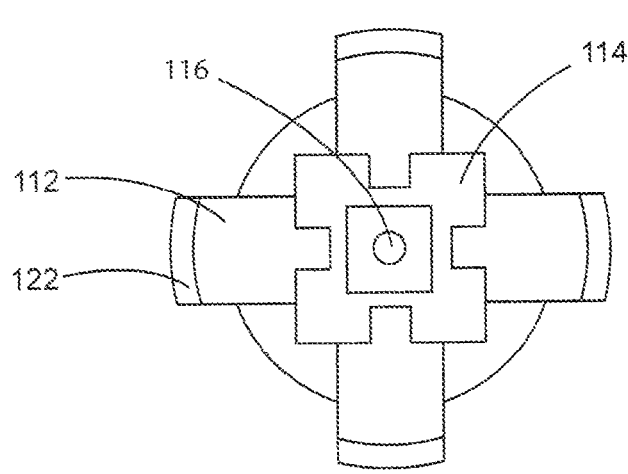
FIG. 10 is a top view of the tap of FIG. 7 showing another manner of holding the flutes and central expansion shaft in alignment.

The second embodiment, generally 110, illustrated in FIGS. 6-10, is similar in construction and operation to the first embodiment shown in FIGS. 1-5. In the second embodiment, however, flutes 112 have inner faces that angle outwardly toward their upper ends, while shaft 114 has outer faces that angle inwardly toward their lower ends at the same angle as flute inner faces. In addition, central guide rod 116 extends vertically upwardly from the center of guide plate 118 between flutes 112. Shaft 114 includes a central bore 120 for insertion of rod 116. As shown in FIGS. 9 and 10, cutting teeth 122 also have a narrower cross-section.

When the second embodiment is used to rethread hole H, flutes 112, slidably attached to wide plate 118 is inserted into the hole H. Shaft 114 is then inserted onto rod 116 and pushed downwardly, moving flutes 112 radially outwardly until flute cutting threads 122 mesh with hole threads. Tool 110 is then rotated counterclockwise to move tool 110 upward in hole H and rethread any damaged threads D.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A rethreading tap for rethreading a blind tapped hole having damaged threads above undamaged threads of said hole, said tap having a central longitudinal axis, comprising:
   a) a rotatable elongated shaft having a central bore along said longitudinal axis and a plurality of outer faces;
   b) a number of flutes corresponding to the number of shaft outer faces, each flute having an inner face and an outer face with a lower segment having cutting threads corresponding to the threads of said hole, each of said flutes being moveable below said damaged threads and then radially between a first closed position adjacent said longitudinal axis to a second radially expanded position distally from said longitudinal axis in which the threads of said flute outer face mesh with the undamaged threads below said damaged threads of said hole, whereby insertion of said shaft against the inner faces of said flutes moves said flutes to their expanded positions;
   c) a guide plate including a number of radial slots corresponding to the number of said flutes, and guide pins extending through said slots into the lower ends of said flutes, said guide pins having a shaft with a smaller diameter than the width of said slot and a head having a diameter greater than the width of said slot; and
   d) a guide rod extending upward from the center of said guide plate and slidably into said shaft bore.

2. The tap of claim 1, wherein said shaft faces have longitudinal ribs and said flute inner faces have longitudinal grooves, said ribs being inserted into said grooves when said shaft is inserted between said flutes.

3. The tap of claim 1, wherein said shaft faces have longitudinal grooves and said flute inner faces have longitudinal ribs, said ribs being inserted into said grooves when said shaft is inserted between said flutes.

4. The tap of claim 1, wherein said shaft has an inwardly tapered lower end.

5. The tap of claim 1, wherein said shaft has a square cross-section with four outer faces, and said tap has four flutes.

6. The tap of claim 1, wherein the inner faces of said flutes angle outwardly toward their upper ends and the outer faces of said shaft angle inwardly toward their lower ends at the same angle as the angle of the flute inner faces.

7. A method of rethreading damaged threads in a blind tapped hole with a given diameter, said tap having a central longitudinal axis, comprising:
   a) providing a tap having a rotatable elongated shaft having a central axis along said longitudinal axis and a plurality of outer faces, a number of flutes corresponding to the number of shaft outer faces, each flute having an inner face and an outer face with a lower segment having cutting threads corresponding to the threads of said hole, each of said flutes being moveable radially-between a first closed position adjacent said longitudinal axis to a second radially expanded position distally from said longitudinal axis in which the threads of said flute outer face mesh with the threads of said hole, whereby insertion of said shaft against the inner faces of said flutes moves said flutes to their expanded positions, and a guide plate to guide the radial movement of said flutes, said guide plate including a number of radial slots corresponding to the number of said flutes, each of said flutes including a lower end with a guide pin extending into one of said slots, said guide pins having a shaft with a smaller diameter than the width of said slot and a head having a diameter greater than the width of said slot, said tap having a diameter less than the diameter of said hole when said flutes are in the closed position;

b) inserting said tap into said hole while said flutes are in the closed position so that said cutting threads are below said damaged threads;

c) inserting said shaft between said flutes to move said flutes to their expanded positions whereby said cutting threads mesh with undamaged hole threads below said damaged threads; and d) rotating said tap to move said cutting threads into engagement with said damaged threads to repair said damaged threads.

8. The method of claim 7, wherein said shaft has a central bore along said longitudinal axis, said tap further including a guide rod extending upward from the center of said guide plate and into said shaft bore.

9. The method of claim 7, wherein said shaft faces have longitudinal ribs or grooves and said flute inner faces have mirroring longitudinal ribs or grooves, said ribs being inserted into said groove when said shaft is inserted between said flutes.

10. The method of claim 7, wherein said shaft has an inwardly tapered lower end.

11. The method of claim 7, wherein said shaft have a square cross-section with four outer faces, and said tap has four flutes.

12. The method of claim 7, wherein the inner faces of said flutes angle outwardly toward their upper ends and the outer faces of said shaft angle inwardly toward their lower ends at the same angle as the angle of the flute inner faces.

* * * * *

UNITED STATES PATENT AND TRADEMARK OFFICE
CERTIFICATE OF CORRECTION

| | | |
|---|---|---|
| PATENT NO. | : 9,227,256 B2 | Page 1 of 1 |
| APPLICATION NO. | : 13/688674 | |
| DATED | : January 5, 2016 | |
| INVENTOR(S) | : John M. Emerson | |

It is certified that error appears in the above-identified patent and that said Letters Patent is hereby corrected as shown below:

Specification

In Column 3, lines 14-15, there should be a "." after position

In Column 3, line 65, the word wide should be "guide"

Signed and Sealed this
Nineteenth Day of April, 2016

Michelle K. Lee
*Director of the United States Patent and Trademark Office*